US006267163B1

(12) United States Patent
Holmes

(10) Patent No.: US 6,267,163 B1
(45) Date of Patent: Jul. 31, 2001

(54) METHOD AND APPARATUS FOR OPERATING A HYDRAULIC DRIVE SYSTEM OF A FELLER-BUNCHER

(75) Inventor: Robert H. Holmes, Bonifay, FL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/448,108

(22) Filed: Nov. 23, 1999

Related U.S. Application Data
(60) Provisional application No. 60/111,429, filed on Dec. 8, 1998, provisional application No. 60/111,434, filed on Dec. 8, 1998, and provisional application No. 60/111,435, filed on Dec. 8, 1998.

(51) Int. Cl.[7] .................................................. A01G 23/08
(52) U.S. Cl. ........................... 144/336; 60/422; 60/466; 180/14.2; 180/242; 180/308; 144/4.1; 144/34.1
(58) Field of Search ....................... 60/466, 422, 427; 144/4.1, 24.13, 34.1, 34.5, 335, 336; 180/53.1, 53.4, 14.2, 14.3, 308, 242, 243; 37/413, 414; 280/400; 83/928

(56) References Cited

U.S. PATENT DOCUMENTS

| 3,643,712 | 2/1972 | Doel et al. ............................ 144/34.5 |
| 3,656,570 | 4/1972 | Gortnar et al. . |
| 3,687,212 | 8/1972 | Forster . |
| 3,827,720 | 8/1974 | Lee . |
| 3,854,543 | 12/1974 | Hull . |
| 3,981,336 | 9/1976 | Levesque .............................. 144/4.1 |
| 4,023,604 | 5/1977 | Stadnick ............................ 144/24.13 |
| 4,205,712 | 6/1980 | Boschen ............................. 144/24.13 |
| 4,207,691 | 6/1980 | Hyler et al. . |
| 4,592,398 | 6/1986 | Golob et al. .......................... 144/4.1 |
| 4,653,555 | 3/1987 | Mellgren .............................. 144/4.1 |
| 4,815,506 | 3/1989 | Kainz ............................... 144/24.13 |
| 4,919,175 | 4/1990 | Samson ............................. 144/24.13 |
| 4,987,935 | 1/1991 | Corcoran et al. .................... 144/34.1 |
| 5,129,438 | 7/1992 | Hamilton ............................. 144/343 |
| 5,170,825 | 12/1992 | Elliot .................................. 144/34.1 |
| 5,427,195 | 6/1995 | Paul et al. . |
| 5,628,354 | 5/1997 | Kingston .......................... 144/4.1 X |
| 5,697,412 | 12/1997 | Kurelek .............................. 144/34.5 |
| 5,727,610 | 3/1998 | Isley .................................... 144/4.1 |

FOREIGN PATENT DOCUMENTS

| 0 437 803 A1 | 7/1991 | (EP) . |
| 0544666B1 | 10/1996 | (EP) . |

Primary Examiner—W. Donald Bray
(74) Attorney, Agent, or Firm—Maginot, Addison & Moore

(57) ABSTRACT

A feller-buncher includes a first axle having a number of first wheels attached thereto and a second axle having a number of second wheels attached thereto. The feller-buncher also includes a first hydraulic motor operable to rotate the first axle and a second hydraulic motor operable to rotate the second axle. The feller-buncher also includes a first hydraulic pump operable to supply pressurized hydraulic fluid. Yet further, the feller-buncher includes a first flow sharing valve fluidly coupled to each of the first hydraulic pump, the first hydraulic motor, and the second hydraulic motor. The first flow sharing valve is configured to distribute the pressurized hydraulic fluid from the first hydraulic pump evenly between the first hydraulic motor and the second hydraulic motor, whereby the first axle and the second axle are driven at a substantially equal speed relative to one another. A method of operating a feller-buncher is also disclosed.

17 Claims, 5 Drawing Sheets

METHOD AND APPARATUS FOR OPERATING A HYDRAULIC DRIVE SYSTEM OF A FELLER-BUNCHER

CROSS REFERENCE

This application claims the benefit of U.S. Provisional Applications Ser. No. 60/111,429, Ser. No. 60/111,434, and Ser. No. 60/111,435; each of which was filed on Dec. 8, 1998.

Cross reference is made to copending U.S. patent application Ser. No. 09/448,112 now U.S. Pat. No. 6,186,198, entitled "Method and Apparatus for Distributing Hydraulic Power in a Feller-Buncher" by Robert H. Holmes, which is assigned to the same assignee as the present invention, and which is filed concurrently herewith. Cross reference is also made to U.S. patent applications Ser. No. 09/328,318, now U.S. Pat. No. 6,026,869, entitled "Cutting Tool Configuration for a Feller-Buncher" by Robert H. Holmes which was filed on Jun. 8, 1999; and Ser. No. 09/328,319, now U.S. Pat. No. 6,035,909, entitled "Hydraulic Drive for a Feller-Buncher" by Robert H. Holmes which was filed on Jun. 8, 1999, both of which are assigned to the same assignee as the present invention.

TECHNICAL FIELD OF THE INVENTION

The present invention relates generally to a feller-buncher, and more specifically to method and apparatus for operating a hydraulic drive system of a feller-buncher.

BACKGROUND OF THE INVENTION

Feller-bunchers are used to fell, or cut down, a number of trees and then to bunch the trees together for transport. The bunched trees are then transported to a storage site for further processing. Typical feller-bunchers are articulated machines that include a front frame and a rear frame that are pivotally coupled by a hitch. The hitch allows the front frame to pivot relative to the rear frame so as to steer the feller-buncher. The front frame includes a front axle having a pair of wheels mounted thereon, and the rear frame includes a rear axle also having a pair of wheels mounted thereon.

An engine mounted on the rear frame supplies mechanical power directly to a drop box. The drop box splits the power output from the engine between the front axle and the rear axle. In particular, a portion of the power from the drop box is supplied directly to the rear axle, and the rest of the power is supplied to the front axle via a drive shaft and universal joint that passes from the rear frame to the front frame at the hitch. A disadvantage to this type of mechanical drive arrangement is that the drive shaft and the universal joint are subjected to high stresses as the front frame is pivoted relative to the rear frame. Thus, the drive shaft and universal joint require regular maintenance to prevent failure. Maintaining or replacing the drive shaft and universal joint is both expensive and time consuming.

The engine also powers a hydraulic system that supplies pressurized hydraulic fluid to several non-drive systems. Generally, the feller-buncher includes a hydraulically powered rotating saw which is used to cut down the trees during a felling operation. In addition, the feller-buncher has a number of hydraulically powered work arms which are used to secure the felled trees to the feller-buncher after the trees have been cut down. Moreover, a number of hydraulic powered cylinders are used to raise, lower, and tilt the rotating saw and work arms. The hydraulic system used to power the rotating saw, the work arms, and the cylinders is separate from the mechanical drive system used to move the work machine from location to location. A disadvantage of the separate systems is that power cannot be transferred between the mechanical drive system and the hydraulic system.

A particular disadvantage of having separate systems is that is it difficult to coordinate the power requirements of the rotating saw and the drive system during a felling operation. The saw must be maintained at a certain minimum rotational speed to cut through the trunks of trees. A problem arises because the power required to cut through the trees increases as the speed of the feller-buncher increases. Thus, as more power is applied to the drive system, the load on the rotating saw increases requiring that additional power be supplied to the rotating saw to maintain the minimum speed. Thus, the total power required to power both the rotating saw and the drive system increases dramatically as the speed of the feller-buncher is increased during a felling operation. However, if the rotating saw and the drive motors shared a common power source, then the increased power demand of the rotating saw would draw power away from the drive system so as to reduce the load on the rotating saw and reduce the total power required to power both the rotating saw and the drive system.

What is needed therefore is an apparatus and method for felling and bunching trees which allows power to be advantageously distributed between the rotating saw and the drive motors which overcome one or more of the above-mentioned drawbacks.

DISCLOSURE OF THE INVENTION

In accordance with a first embodiment of the present invention, there is provided a method of operating a feller-buncher having (i) a first hydraulic motor operable to rotate a first axle having a number of first wheels attached thereto, (ii) a second hydraulic motor operable to rotate a second axle having a number of second wheels attached thereto, (iii) a first hydraulic pump operable to supply pressurized hydraulic fluid, and (iv) a first flow sharing valve operable to receive pressurized hydraulic fluid from the first hydraulic pump. The method includes the step of advancing the pressurized hydraulic fluid from the first hydraulic pump to the first flow sharing valve. The method also includes the step of distributing the pressurized hydraulic fluid from the first hydraulic pump evenly between the first hydraulic motor and the second hydraulic motor with the first flow sharing valve such that the first axle and the second axle are driven at a substantially equal speed relative to one another.

In accordance with a second embodiment of the present invention, there is provided a feller-buncher. The feller-buncher includes a first axle having a number of first wheels attached thereto and a second axle having a number of second wheels attached thereto. The feller-buncher also includes a first hydraulic motor operable to rotate the first axle and a second hydraulic motor operable to rotate the second axle. The feller-buncher also includes a first hydraulic pump operable to supply pressurized hydraulic fluid. Yet further, the feller-buncher includes a first flow sharing valve fluidly coupled to each of the first hydraulic pump, the first hydraulic motor, and the second hydraulic motor. The first flow sharing valve is configured to distribute the pressurized hydraulic fluid from the first hydraulic pump evenly between the first hydraulic motor and the second hydraulic motor, whereby the first axle and the second axle are driven at a substantially equal speed relative to one another.

In accordance with a third embodiment of the present invention, there is provided a method of operating a feller-buncher having (i) a first hydraulic motor operable to rotate a first axle having a number of first wheels attached thereto, (ii) a hydraulically powered work tool, (iii) a first hydraulic pump operable to supply pressurized hydraulic fluid, and (iv) a first flow sharing valve operable to receive pressurized hydraulic fluid from the first hydraulic pump. The method includes the step of advancing the pressurized hydraulic fluid from the first hydraulic pump to the first flow sharing valve. The method also includes the step of distributing the pressurized hydraulic fluid from the first hydraulic pump evenly between the first hydraulic motor and the work tool with the first flow sharing valve.

BEST MODE FOR CARRYING OUT THE INVENTION

Figure 1:
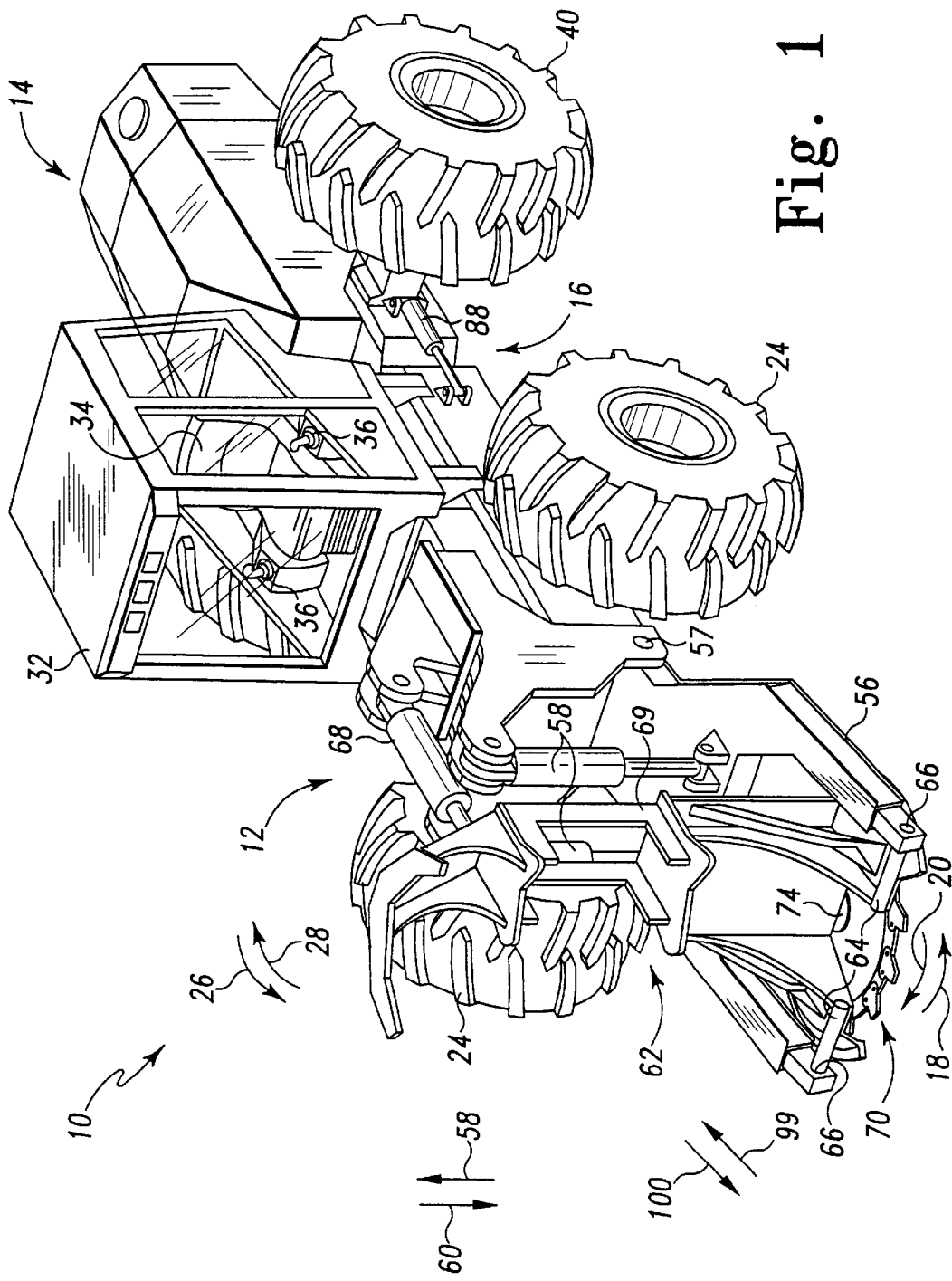
FIG. 1 is a perspective view of a feller-buncher which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
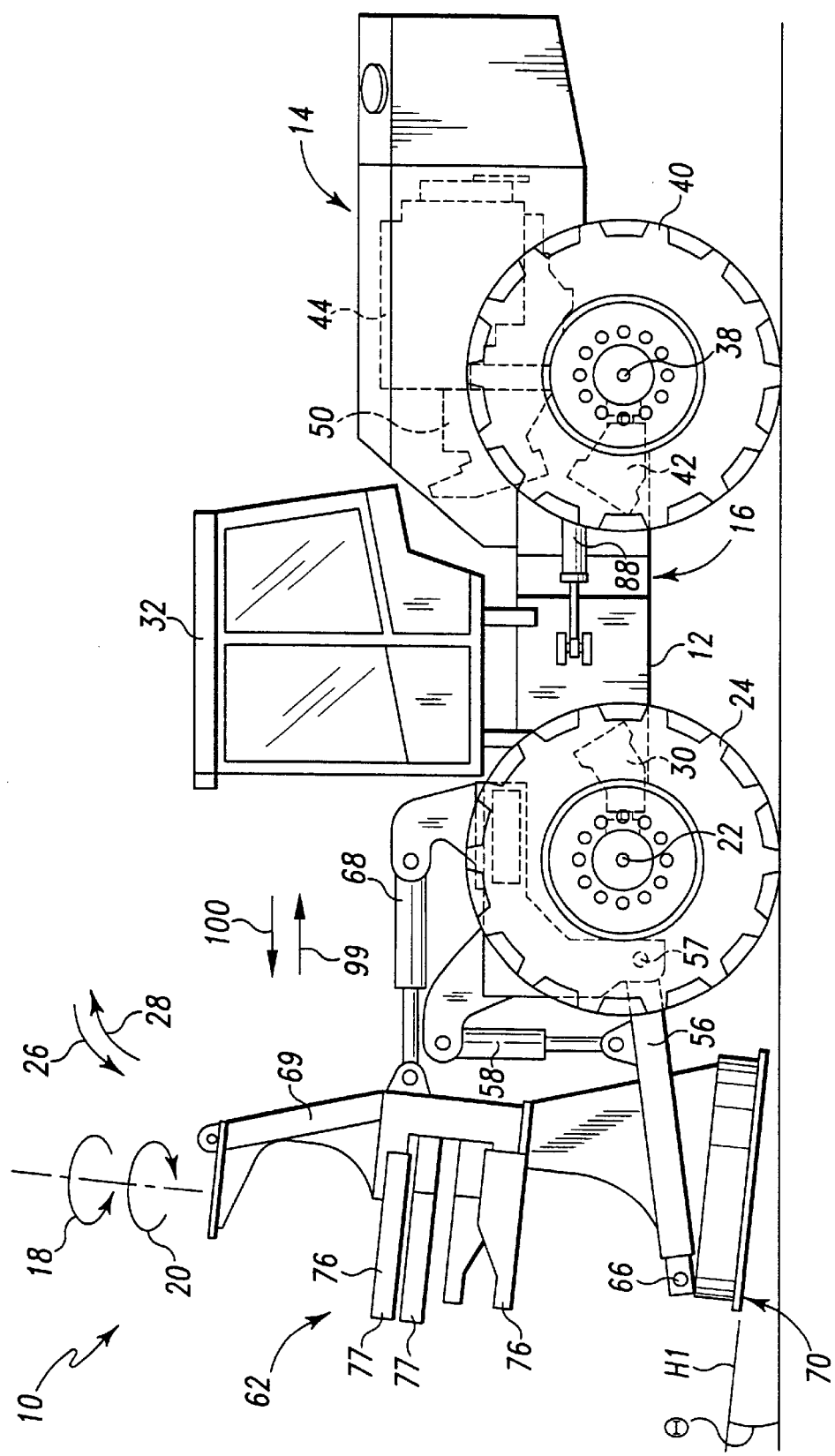
FIG. 2 is a side elevational view of the feller-buncher of FIG. 1.

Referring now to FIGS. 1 and 2, there is shown a feller-buncher 10 that incorporates the features of the present invention therein. The feller-buncher 10 includes front frame 12 and a rear frame 14. The front frame 12 is pivotally connected to the rear frame 14 via a hitch 16. In particular, the hitch 16 allows the front frame 12 to pivot relative to the rear frame 14 in the general direction of arrows 18 and 20 of FIG. 1.

The front frame 12 is supported by a front axle 22. Two wheels 24 are mounted to the front axle 22. In particular, the front axle 22 and the wheels 24 can rotate relative to the front frame 12 in the general direction of arrows 26 and 28. A front hydraulic motor 30, shown in FIG. 2, is supported by the front frame 12 and operatively coupled to the front axle 22. The front hydraulic motor 30 is a bi-directional motor which allows the front hydraulic motor 30 to drive the front axle in the general direction of arrow 26 or 28. Driving the front axle 22 in the general direction of arrow 26 advances the front frame 12 in the general direction of arrow 100 whereas driving the front axle 22 in the general direction of arrow 28 advances the front frame 12 in the general direction of arrow 99. The front frame 12 further supports a cab 32 which includes a seat 34 (shown in FIG. 1) for an operator of the feller-buncher 10. The cab 32 further includes a number of controls 36 (shown in FIG. 1) which are manipulated by the operator to control various operations of the feller-buncher 10.

The rear frame 14 is similarly supported by a rear axle 38. Two wheels 40 are mounted to the rear axle 38. In particular, the rear axle 38 and the wheels 40 can rotate relative to the rear frame 14 in the general direction of arrows 26 and 28. A rear hydraulic motor 42 is supported by the rear frame 14 and operatively coupled to the rear axle 38. The rear hydraulic motor 42 is a bi-directional motor which allows the rear hydraulic motor 42 to drive the rear axle 38 in the general direction of arrow 26 or 28. Driving the rear axle 38 in the general direction of arrow 26 advances the rear frame 14 in the general direction of arrow 100 whereas driving the rear axle 38 in the general direction of arrow 28 advances the rear frame 14 in the general direction of arrow 99.

The feller-buncher 10 further includes an engine 44. The engine 44 is mounted on the rear frame 14. The engine 44 generates mechanical energy which is transferred to a pump assembly 50. The pump assembly 50 includes a number of pumps which convert the mechanical energy of the engine 44 to hydraulic energy which is used to power various hydraulic components of the feller-buncher 10, such as the front hydraulic motor 30 and the rear hydraulic motor 42. In particular, the pump assembly 50 includes a pump housing 51, a first hydraulic pump 52, and a second hydraulic pump 54. Both the first hydraulic pump 52 and the second hydraulic pump 54 are contained within the pump housing 51. Each of the first hydraulic pump 52 and the second hydraulic pump 54 is a variable displacement pump that can provide a variable volume of pressurized fluid to the hydraulically powered components of the feller-buncher 10.

The feller-buncher 10 further includes a yoke 56 pivotally attached to the front frame 12. In particular, the yoke 56 rotates relative to the front frame 12 in the general direction of arrows 26 and 28 about a pin 57. A pair of lift cylinders 58 are interposed between the front frame 12 and the yoke 56. As the lift cylinders 58 are extended, the lift cylinders 58 cause the yoke 56 to move in the general direction of arrow 60 which causes the yoke to pivot about the front frame 12 in the general direction of arrow 26. On the other hand, as the lift cylinders 58 are retracted, the lift cylinders 58 cause the yoke 56 to move in the general direction of arrow 58 which causes the yoke 56 to pivot about the front frame 12 in the general direction of arrow 28.

A work tool 62 is pivotally mounted to the yoke 56. To this end, the work tool 62 includes a pair of pins 64 which are recieved in one of a respective pin aperture 66 defined in the yoke 56. The pins 64 allow the work tool 62 to pivot about the yoke in the general direction of arrows 26 and 28. A tilt cylinder 68 is interposed between the front frame 12 and an upper portion of the work tool 62. As the tilt cylinder 68 is extended, the tilt cylinder 68 urges the upper portion of the work tool in the general direction of arrow 100 which causes the work tool 62 to rotate in the general direction of arrow 26 about the pin apertures 66 of the yoke 56. Conversely, as the tilt cylinder 68 is retracted, the tilt cylinder 68 urges the upper portion of the work tool in the general direction of arrow 99 which causes the work tool 62 to rotate in the general direction of arrow 28 about the pin apertures 66 of the yoke 56.

Figure 3:
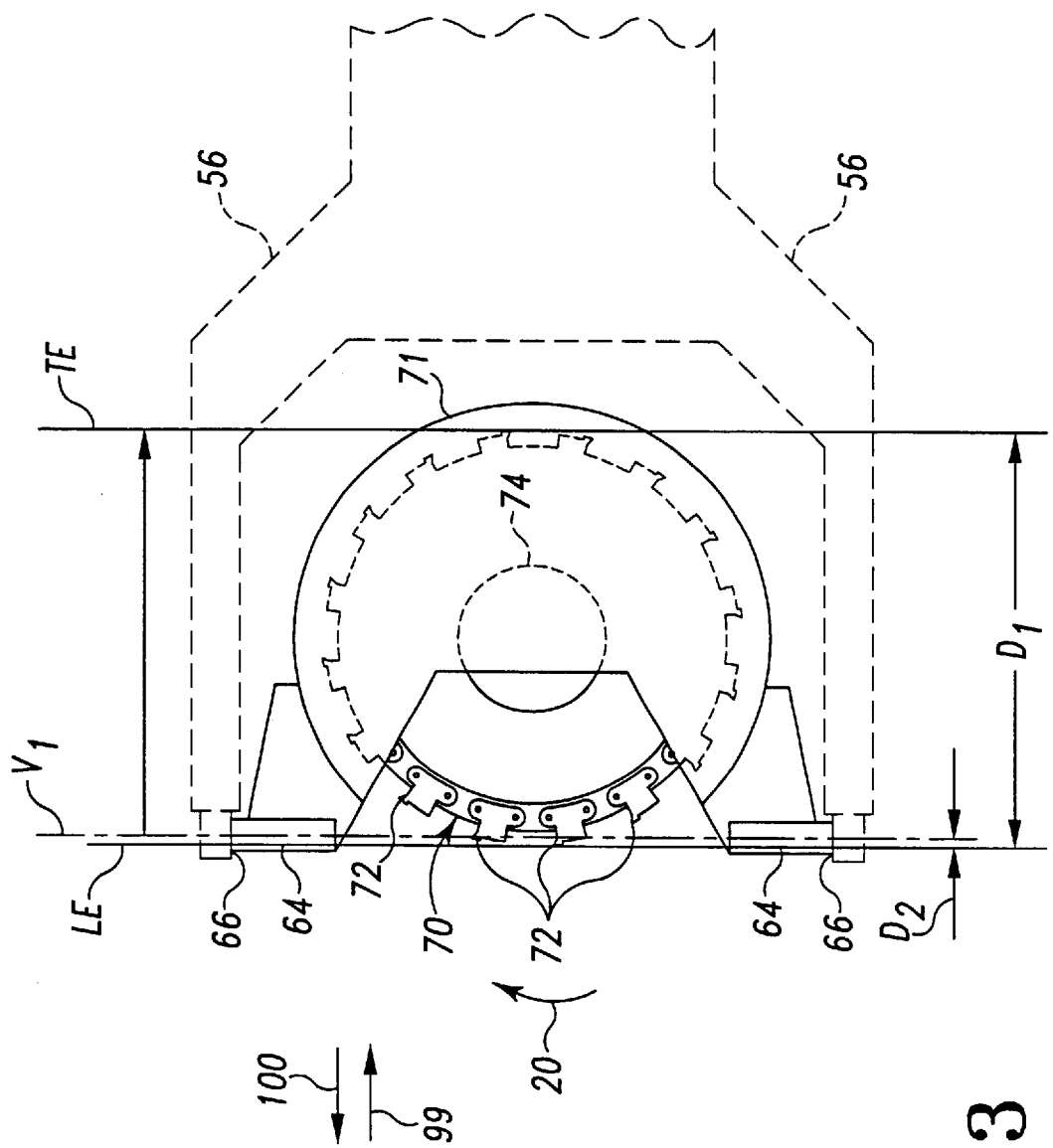
FIG. 3 is an enlarged top elevational view of cutting tool of the feller-buncher of FIG. 1.

Referring now to FIGS. 2 and 3, the work tool 62 includes a support member 69 which supports various components of the work tool 62. The work tool 62 further includes a cutting tool 70 which is rotatably secured to a lower portion of the support member 69 such that the cutting tool 70 can rotate in the general direction of arrow 20. The cutting tool 70 is a rotating saw having number of blades, or cutting teeth 72, defined thereon (see FIG. 3). A saw motor 74 is secured to the support member 69 and is operative to rotate the cutting tool 70 in the general direction of arrow 20. In particular, the saw motor 74 is a hydraulic motor which is powered by one or more of the first hydraulic pump 52 and the second hydraulic pump 54. During a felling operation, the feller-buncher 10 is advanced in the general direction of arrow 100 and the cutting tool 70 is rotated in the general direction of arrow 20. As the cutting tool 70 is rotated in the general direction of arrow 20, the cutting teeth 72 cut through any trees that come into contact with the cutting tool 70. The cutting tool 70 further includes a blade guard 71 which covers the side, rear, and underneath portions of the rotating cutting tool 70 that are not advanced into a tree during a felling operation.

Referring again to FIG. 3, the cutting tool 70 defines a leading edge LE. The leading edge LE is a line that defines the furthest point of the cutting tool 70 in the general direction of arrow 100. The leading edge LE defines the most forward point at which the cutting tool 70 can begin to cut into trees as the feller-buncher 10 is advanced in the general direction of arrow 100. Similarly, the cutting tool 70 defines a trailing edge TE. The trailing edge TE is furthest point of the cutting tool 70 in the general direction of arrow 99. The trailing edge TE is a line that defines the most rearward point of the cutting tool 70. It should be appreciated that as the tilt cylinder 68 is extended, the work tool 62 rotates about the pins 64 in the general direction of arrow 26 so as to position the leading edge LE closer to the ground. On the other hand, as the tilt cylinder 68 is retracted, the work tool 62 rotates about the pins 64 in the general direction of arrow 28 so as to position the leading edge LE farther from the ground.

In addition, the pivot axis of the work tool 62 about the pin apertures 66 of yoke 56 defines a vertical plane, and the vertical plane intersects the work tool 70 to define a line V1. A first distance D1 is defined as the distance between the leading edge LE and the trailing edge TE. A second distance D2 is defined as the distance between the line V1 and the leading edge LE. The second distance D2 is less than one half of the first distance D1. Preferably, the second distance D2 is less than one fourth of the distance D1. It should be appreciated that reducing the distance D2 decreases the vertical movement of the leading edge LE of the cutting tool 70 as the work tool is rotated relative to the yoke 56 in the general direction of arrows 18 and 20.

Referring again to FIG. 2, the leading edge LE and the trailing edge TE define a line H1. The line H1 intersects with the ground to form an angle θ1. It should be appreciated that the front frame 12, yoke 56, work tool 62, and tilt cylinder 68 are advantageously configured to maintain the angle θ1 substantially the same as the lift cylinders 58 are moved between the extended and the retracted positions. Thus, because of the configuration of the tilt cylinder 68 relative to the work tool 62, the tilt cylinder prevents the rotation of the work tool 62 relative to the ground and the angle θ1 remains substantially the same as the lift cylinders 58 are retracted.

On a similar note, because of the configuration of the tilt cylinder 68 relative to the work tool 62, the tilt cylinder 68 prevents the rotation of the work tool 62 relative to the ground and the angle θ1 remains substantially the same as the lift cylinders 58 are extended. Thus, the angle θ1 is maintained at a substantially constant value as the lift cylinders 56 are extended and retracted.

Referring again to FIGS. 1 and 2, the work tool 62 further includes a number of work arms 76, 77 (shown in FIGS. 2 and 3) which are rotatably secured to the support member 69. An arm cylinder 78 (shown in FIG. 4) is operable to move the work arms 76, 77 between a receiving position in which trees can be advanced between the work arms 76, 77 and a securing position in which trees are secured to the support member 69. In particular, as the arm cylinder 78 is extended, the work arm 76 rotates in the general direction of arrow 20 from the receiving position, shown in FIG. 4, to the securing position, not shown. Concurrently, as the arm cylinder 78 is extended, the work arm 77 rotates in the general direction of arrow 18 from the receiving position, shown in FIG. 4, to the securing position, not shown, thereby securing any trees within the work tool 62.

Once the trees have been felled, or cut, by the cutting tool 70 and secured within the work tool 62 by the work arms 76, 77, the trees are transported to a site where the trees are stored for further processing. To remove the trees from the work tool 62, (i) the trees must be unsecured from the work tool 62 and (ii) the work tool 62 must be tilted forward in the general direction of arrow 26 so that the trees will fall to the ground in front of the feller-buncher 10. To unsecure the trees from the work tool 62, the arm cylinder 78 is retracted causing the work arm 76 to rotate in the general direction of arrow 18 from the securing position, not shown, to the receiving position, shown in FIG. 4. Concurrently, as the arm cylinder 78 is retracted, the work arm 77 rotates in the general direction of arrow 20 from the securing position, not shown, to the receiving position, shown in FIG. 4, thereby releasing the trees previously secured within the work tool 62.

To tilt the work tool 62 forward, the tilt cylinder 68 is extended thereby causing the work tool 62 to rotate relative to the yoke 56 in the general direction of arrow 26. It should be appreciated that a significant advantage of the present invention is that as the work tool 62 is tilted forward in the general direction of arrow 26, the leading edge LE (shown in FIG. 3) of the cutting tool 70 is not moved significantly closer to the ground than prior to the tilting of the work tool 62. In feller-bunchers that have heretofore been designed, as the work tool is tilted forward, the leading edge of the work tool is urged toward the ground thereby making it likely that the work tool could be damaged by contacting the ground. To avoid damaging the work tool, operators of prior art feller bunchers would raise the yoke prior to tilting the work tool, thus making the feller buncher less stable.

The present invention has the advantages of (i) reducing the probability that the cutting tool 70 of the work tool 62 will be damaged during an unloading operation, (ii) being easier for the operator to operate because the unloading operation does not require the additional action of raising the work tool 62 when the work tool 62 is tilted forward in the general direction of arrow 26, and (iii) increasing the stability of the feller-buncher 10 during unloading operations because the work tool 62 is maintained lower to the ground.

Figure 4:
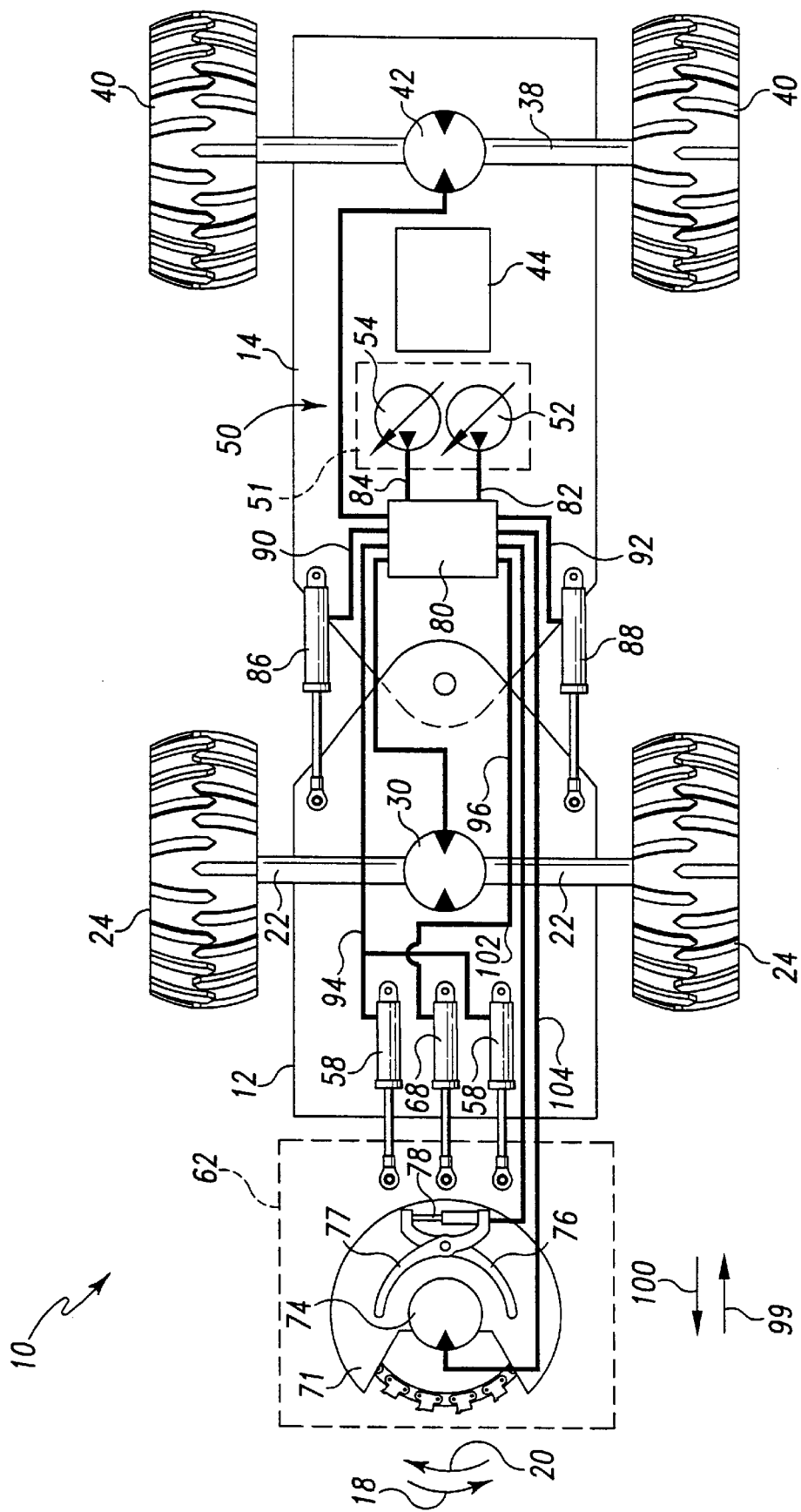
FIG. 4 is a schematic view of the hydraulic system of the feller buncher of FIG. 1.

Referring now to FIG. 4, there is shown a schematic view of the hydraulic system of the feller-buncher 10. The feller-buncher 10 further includes a valve assembly 80. Pressurized fluid from the first hydraulic pump 52 is supplied to the valve assembly 80 via the fluid line 82 and pressurized fluid from the second hydraulic pump 54 is supplied to the valve assembly 80 via the fluid line 84. From the valve assembly 80, pressurized hydraulic fluid is supplied to the various hydraulic components of the feller-buncher 10. Pressurized hydraulic fluid is used to power the front hydraulic motor 30 and the rear hydraulic motor 42 so as to propel the feller buncher 10 in the general direction of arrows 99 and 100.

In addition, pressurized hydraulic fluid is used to steer the feller-buncher 10. To this end, the feller-buncher 10 further includes a right steering cylinder 86 and a left steering cylinder 88 which are operable to rotate the front frame 12 relative to the rear frame 14 about the hitch 16 in the general direction of arrows 18 and 20. Pressurized hydraulic fluid is advanced from the valve assembly 80 to the right steering cylinder 86 via the fluid line 90 whereas pressurized hydraulic fluid is advanced from the valve assembly 80 to the left steering cylinder 88 via the fluid line 92. To steer to the feller-buncher 10 to the right, the right steering cylinder 86 is retracted and the left steering cylinder 88 is extended. To steer to the feller-buncher 10 to the left, the right steering cylinder 86 is extended and the left steering cylinder 88 is retracted.

Pressurized hydraulic fluid from the valve assembly 80 is also used to power other components of the feller-buncher 10. In particular, pressurized fluid in the fluid line 94 is used to power the lift cylinders 58, pressurized fluid in the line 96 is used to power the tilt cylinder 98, pressurized fluid in the fluid line 104 is used to power the saw motor 74, and pressurized fluid in the line 102 is used to power the arm cylinder 78. In addition, hydraulic pressure from the first hydraulic pump 52 and second hydraulic pump 54 may be used to power other hydraulic devices such as brakes (not shown) and locking differentials (not shown) on the front axle 22 and the rear axle 38.

It should be appreciated that a significant advantage of the present invention is that a single hydraulic system is used to power both the drive and non-drive components of the feller-buncher 10. In feller-bunchers that have heretofore been designed, the front axles and rear axles are typically driven by a mechanical drive system. This mechanical drive systems include a drop box which splits mechanical power between the front and rear axles and a drive shaft and universal joint which transfers mechanical power across the hitch. Each of these mechanical components are high maintenance items which are expensive to operate. By using the hydraulic drive motors 30, 42, the drop box, drive shaft, and universal joint can be eliminated.

In addition, prior art work machines, such as feller-bunchers, which use hydraulics to drive the wheels, typically have a separate hydraulic system for the drive components and the non-drive components such as lift cylinders and tilt cylinders. Having two separate hydraulic systems increases the complexity of the work machine. In addition, the separating the hydraulic systems prevents any transfer of hydraulic power from one system to the other.

Figure 5:
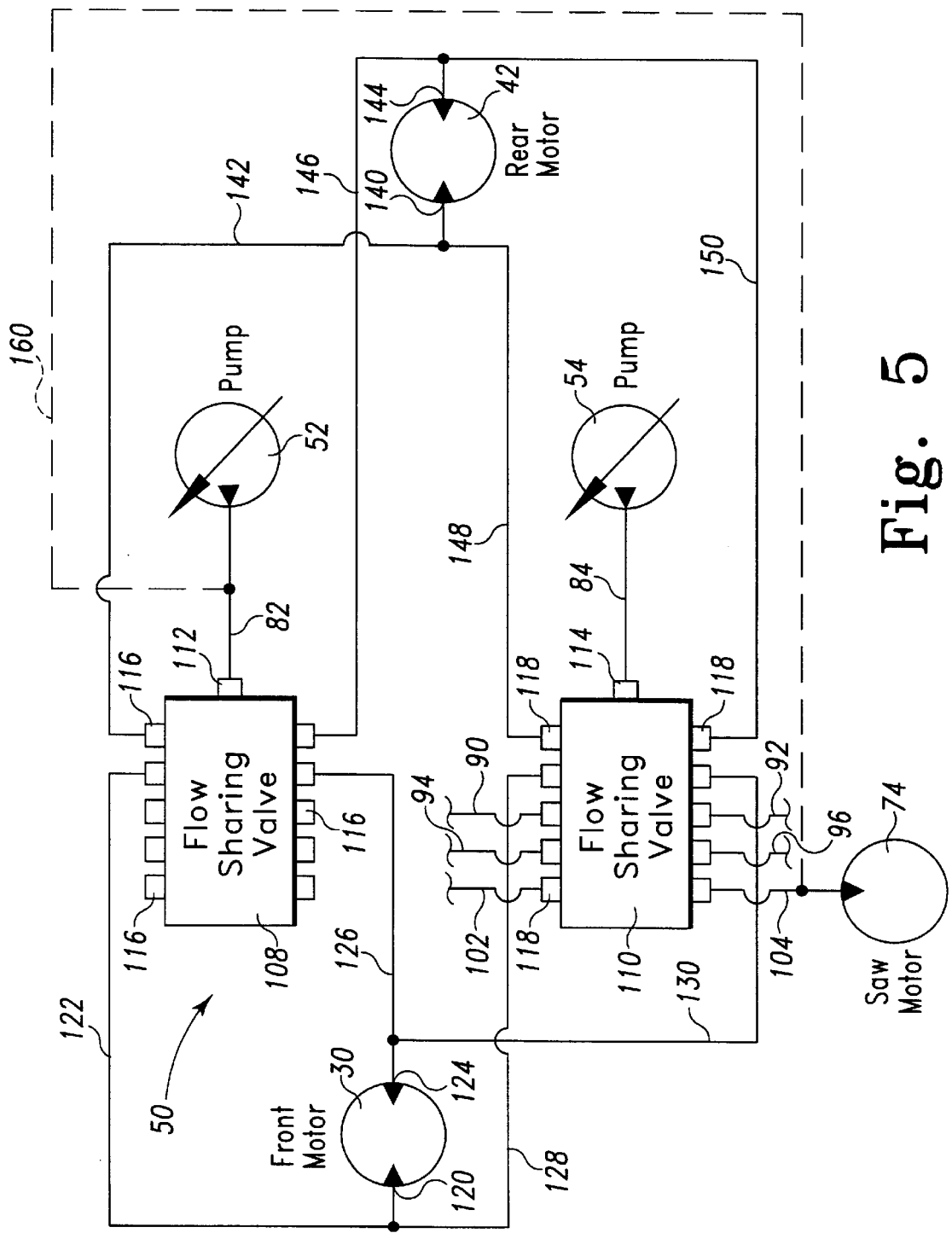
FIG. 5 is a schematic view of the valve assembly of the hydraulic system shown in FIG. 4.

Referring now to FIG. 5, there is shown the valve assembly 80 in greater detail. The valve assembly 80 includes a pair of flow sharing valves 108, 110. The flow sharing valve 108 has an input port 112 which is fluidly coupled to the output of the first hydraulic pump 52 via the fluid line 82, whereas the flow sharing valve 110 has an input port 114 which is fluidly coupled to the output of the second hydraulic pump 54 via the fluid line 84. In such a manner, pressurized hydraulic fluid is supplied to the flow sharing valves 108, 110 by the hydraulic pumps 52, 54, respectively, so as to be distributed to the hydraulic components associated with the feller-buncher 10. In particular, each of the flow sharing valves 108, 110, has a number of output ports 116, 118, respectively, associated therewith which are fluidly coupled to the hydraulic components associated with the feller-buncher 10. For example, as shown in FIG. 5, the saw motor 74 is coupled to one of the output ports 118 of the flow sharing valve 110 via the fluid line 104.

Moreover, a first port 120 of the front motor 30 is fluidly coupled to one of the output ports 116 of the flow sharing valve 108 via a fluid line 122, whereas a second port 124 of the front motor 30 is fluidly coupled to a different output port 116 of the flow sharing valve 108 via a fluid line 126. The front motor 30 is also fluidly coupled to the flow sharing valve 110. In particular, the first port 120 of the front motor 30 is fluidly coupled to one of the output ports 118 of the flow sharing valve 110 via a fluid line 128, whereas the second port 124 of the front motor 30 is fluidly coupled to a different output port 118 of the flow sharing valve 110 via a fluid line 130. It should be appreciated that when pressurized hydraulic fluid is supplied to the first port 120 of the front motor 30, the front motor 30 generates mechanical output in a first direction so as to drive the front axle 22 (and hence the front wheels 24) in a forward direction (i.e. in the general direction of arrow 26 of FIG. 2). Conversely, when pressurized hydraulic fluid is supplied to the second port 124 of the front motor 30, the front motor 30 generates mechanical output in an opposite direction so as to drive the front axle 22 (and hence the front wheels 24) in a reverse direction (i.e. in the general direction of arrow 28 of FIG. 2).

The rear motor 42 is fluidly coupled to the flow sharing valves 108, 110 in a similar manner. In particular, a first port 140 of the rear motor 42 is fluidly coupled to one of the output ports 116 of the flow sharing valve 108 via a fluid line 142, whereas a second port 144 of the rear motor 42 is fluidly coupled to a different output port 116 of the flow sharing valve 108 via a fluid line 146. The rear motor 42 is also fluidly coupled to the flow sharing valve 110. In particular, the first port 140 of the rear motor 42 is fluidly coupled to one of the output ports 118 of the flow sharing valve 110 via a fluid line 148, whereas the second port 144 of the rear motor 42 is fluidly coupled to a different output port 118 of the flow sharing valve 110 via a fluid line 150. It should be appreciated that when pressurized hydraulic fluid is supplied to the first port 140 of the rear motor 42, the rear motor 42 generates mechanical output in a first direction so as to drive the rear axle 38 (and hence the rear wheels 40) in a forward direction (i.e. in the general direction of arrow 26 of FIG. 2). Conversely, when pressurized hydraulic fluid is supplied to the second port 144 of the rear motor 42, the rear motor 42 generates mechanical output in an opposite direction so as to drive the rear axle 38 (and hence the rear wheels 40) in a reverse direction (i.e. in the general direction of arrow 28 of FIG. 2).

Similarly, the remaining output ports 116, 118 of the flow sharing valves 108, 110, respectively, are utilized to provide pressurized hydraulic fluid to the remaining hydraulic components associated with the feller-buncher 10. In particular, the steering cylinders 86, 88, the lift cylinders 58, the tilt cylinder 68, and the arm cylinder 78 are each fluidly coupled to the any one of the remaining output ports 116, 118 of the flow sharing valves 108, 110. In one embodiment of the present invention, the fluid lines 90, 92 are fluidly coupled to a respective output port 118 of the flow sharing valve 110 thereby fluidly coupling the steering cylinders 86, 88 to the pump 54. Moreover, the fluid lines 94, 96 are also fluidly coupled to a respective output port 118 of the flow sharing valve 110 thereby fluidly coupling the lift cylinders 58 and the tilt cylinder 68, respectively, to the pump 54. Yet further, the fluid line 102 is also fluidly coupled to one of the output ports 118 of the flow sharing valve 110 thereby fluidly coupling the arm cylinder 78 to the pump 54.

The flow sharing valves 108, 110 are configured to divide or otherwise distribute equally the flow of pressurized hydraulic fluid from the pumps 52, 54, respectively, between the components coupled to the output ports 116, 118, respectively. For example, the flow of pressurized hydraulic fluid from the pump 52 is distributed equally between the front motor 30 and the rear motor 42 by the flow sharing valve 108. Such equal sharing of the flow of pressurized hydraulic fluid from the pump 52 causes the motors 30, 42 to generate substantially the same mechanical output thereby causing the axles 22, 38 (and hence the wheels 24, 40) to be driven at substantially the same speed.

It should be appreciated that the direction at which the axles 22, 38 are rotated (and hence the direction at which the feller-buncher 10 travels) is based on the position of the flow sharing valves 108, 110. In particular, the flow sharing valves 108, 110 are positionable in a number of valve positions in order to selectively deliver pressurized hydraulic fluid through the various output ports 116, 118 associated therewith. More specifically, the flow sharing valves 108, 110 are under operator control by way of, for example, the controls 36 (see FIG. 1) such that hydraulic fluid is selectively advanced through the individual output ports 116, 118.

For example, in particular regard to the flow sharing valve 108, when the operator of the feller-buncher 10 operates the controls 36 in a manner indicative of a request for forward advancement of the feller-buncher 10, the flow sharing valve 108 assumes a forward valve position in which pressurized hydraulic fluid is advanced through the output ports 116 coupled to the first port 120 of the front motor 30 and the first port 140 of the rear motor 42 thereby driving the axles 22, 38 in a forward direction. Conversely, when the operator of the feller-buncher 10 operates the controls 36 in a manner indicative of a request for reverse advancement of the feller-buncher 10, the flow sharing valve 108 assumes a reverse valve position in which pressurized hydraulic fluid is advanced through the output ports 116 coupled to the second port 124 of the front motor 30 and the second port 144 of the rear motor 42 thereby driving the axles 22, 38 in a reverse direction.

In a similar manner, the flow of pressurized hydraulic fluid from the pump 54 is distributed equally between the front motor 30 and the rear motor 42 by the flow sharing valve 110 if the other components coupled to the flow sharing valve 110 are not currently being operated (and thereby do not require pressurized hydraulic fluid). However, if one or more of the other components coupled to the flow sharing valve 110 is being operated during advancement of the feller-buncher 10, and therefore requires pressurized hydraulic fluid, the flow sharing valve 110 equally distributes the flow of pressurized hydraulic fluid between the motors 30, 42 and any such components. For example, if the saw motor 74 is being operated by the operator during advancement of the feller-buncher 10, the flow sharing valve 110 distributes the flow of pressurized hydraulic fluid from the pump 54 evenly between each of the front motor 30, the rear motor 42, and the saw motor 74. Such equal sharing of the flow of pressurized hydraulic fluid from the pump 54 assures that adequate fluid pressure is available to operate the components associated with feller-buncher 10. Similarly, if additional components are also being operated by the operator, the flow sharing valve 110 shares pressurized hydraulic fluid in a similar manner. For example, the flow sharing valve 110 is configured to evenly distribute the flow of pressurized hydraulic fluid from the pump 54 between the motors 30, 42, the saw motor 74, and the arm cylinder 78 if the operator is operating the feller-buncher 10 in a manner which requires use of all of the above-mentioned components.

As with the flow sharing valve 108, the flow sharing valve 110 assumes the various valve positions which are necessary to provide pressurized hydraulic fluid to the various components associated with the feller-buncher 10 in response to manipulation of the controls 36 by the operator. For example, when the operator of the feller-buncher 10 operates the controls 36 in a manner indicative of a request for forward advancement of the feller-buncher 10, the flow sharing valve 110 assumes its forward valve position in which pressurized hydraulic fluid is advanced through the output ports 118 coupled to the first port 120 of the front motor 30 and the first port 140 of the rear motor 42 thereby driving the axles 22, 38 in a forward direction. Conversely, when the operator of the feller-buncher 10 operates the controls 36 in a manner indicative of a request for reverse advancement of the feller-buncher 10, the flow sharing valve 110 assumes its reverse valve position in which pressurized hydraulic fluid is advanced through the output ports 118 coupled to the second port 124 of the front motor 30 and the second port 144 of the rear motor 42 thereby driving the axles 22, 38 in a reverse direction. Similarly, the remaining output ports 118 are also under operator control such that pressurized hydraulic fluid may be selectively advanced to the other components coupled to the flow sharing valve 110 (e.g. the saw motor 74 and the cylinders 58, 68, 78, 86, and 88).

It should be appreciated that such operator control of the flow sharing valves 108, 110 may be accomplished in a number of different manners. For example, the flow sharing valves 108, 110 may be configured as pilot actuated valves which are selectively positioned in their respective valve positions by a low pressure pilot control circuit, or may alternatively be provided as electrohydraulic valves which are positioned in their respective valve positions by an electrically actuated solenoid. Moreover, the flow sharing valves 108, 110 may be embodied as any known flow sharing valve which is capable of evenly distributing a flow of pressurized hydraulic fluid to the components coupled thereto. For example, flow sharing valves which are suitable for use as the flow sharing valves 108, 110 of the present invention are MW or VW Series flow sharing valves which are commercially available from Linde Hydraulics of Canfield, Ohio.

The feller-buncher 10 also includes a load sensing circuit 160. The load sensing circuit is provided to sense the load on the work tool 62 as the cutting tool 70 contacts or otherwise cuts through a tree. In particular, the saw motor 74 is configured to be operated at a predetermined rotational speed. Hence, by sensing the magnitude of fluid pressure present in the fluid line 104, the load on the saw motor may be determined. More specifically, the load on the saw motor 74 may be determined by sensing the magnitude of fluid pressure that is required to operate the saw motor 74 at its predetermined speed. Accordingly, the load sensing circuit 160 is provided to sense the magnitude of fluid pressure present in the fluid line 104 and communicate the same to the first hydraulic pump 52. The first hydraulic pump 52 is configured to adjust output therefrom based on the fluid pressure level communicated from load sensing circuit 160. In particular, as the load on the saw motor 74 increases, fluid pressure in the load sensing circuit 160 likewise increases. Such an increase in fluid pressure within the load sensing circuit 160 is communicated to the pump 52 thereby causing output from the pump 52 to be reduced. Such a reduction in output from the pump 52 provides two main advantages. Firstly, by reducing output from the pump 52, advancement of the feller-buncher 10 is slowed down as the feller-buncher 10 saws through the tree or trees thereby preventing the feller-buncher 10 from advancing at a rate which is faster than the rate at which the cutting tool 70 can cut through the tree or trees. Secondly, by reducing output from the pump 52 as the load on the saw motor 74 increases, the amount of engine horsepower from the engine 44 that is needed to drive the pump 52 is likewise decreased. This renders more engine horsepower from the engine 44 available to drive the pump 54 thereby ensuring that adequate engine horsepower is available to drive the pump 54 and hence the saw motor 74 at a speed which is needed to perform the sawing operation.

Conversely, as the load on the saw motor 74 decreases fluid pressure in the load sensing circuit 160 likewise decreases. Such a decrease in fluid pressure within the load sensing circuit 160 is communicated to the pump 52 thereby causing output from the pump 52 to be increased. Such an increase in output from the pump 52 increases the speed at which the feller-buncher 10 is being advanced (up to the speed level being requested by the operator) thereby allowing the feller-buncher 10 to be advanced at a rate which corresponds to the rate at which the cutting tool 70 can cut through the tree or trees being cut.

Although the load on the saw motor 74 is herein described as being determined based on fluid pressure within the fluid line 104 (as detected by the hydraulic sensing circuit 160), and has significant advantages thereby in the present invention, certain of such advantages may be realized by use of other load detection schemes. For example, an electric load sensor may be operatively coupled to the saw motor 74 to determine load on the saw motor.

Industrial Applicability

In operation, the feller-buncher 10 is maneuvered toward a group of trees. In particular, pressurized hydraulic fluid from the first hydraulic pump 52 and the second hydraulic pump 54 is supplied to the front hydraulic motor 30 and the rear hydraulic motor 42 to propel the feller-buncher 10 in the desired direction. Furthermore, pressurized hydraulic fluid is advanced to the right steering cylinder 86 and the left steering cylinder 88 to steer the feller-buncher 10 toward the trees in the desired direction.

As the feller buncher approaches the trees, pressurized hydraulic fluid is advanced to the saw motor 74 from the pump 54 via the flow sharing valve 110 which causes the cutting tool 70 to rotate in the general direction of arrow 20. As the feller-buncher 10 advances toward the trees, the cutting teeth 72 of the cutting tool 70 cut through the trunks of the trees. Concurrently, the work arms 76, 77 are moved from a receiving position to a securing position so as to secure the trees within the work tool 62.

As the load on the saw motor 74 increases (as detected by the load sensing circuit 160), the amount of hydraulic fluid advanced to the saw motor 74 must be increased to maintain the rotational speed of the saw motor 74 above a minimum rotational speed. Hence, output from the pump 52 is decreased thereby decreasing the amount of hydraulic fluid advanced to the drive motors 30, 42 via the flow sharing valve 108 which decreases the speed at which the feller-buncher 10 is being advanced, while also providing the fluid pressure necessary to operate the cutting tool 70.

On the other hand, as the load on the saw motor 74 decreases, the amount of hydraulic fluid advanced to the saw motor 74 can be decreased while maintaining the rotational speed of the saw motor 74 above the minimum rotational speed. Hence, output from the pump 52 is increased thereby increasing the amount of hydraulic fluid advanced to the drive motors 30, 42 via the flow sharing valve 108 which allows the speed at which the feller-buncher 10 is being advanced to be increased. Thus, the valve assembly 80 automatically reduces the speed of the feller-buncher 10 as the load on the saw motor 74 increases and automatically allows the speed of the feller-buncher 10 to be increased as the load on the saw motor 74 decreases.

Subsequently, the feller-buncher 10 moves to a site where the trees are to be unloaded from the feller-buncher 10 for further processing. Once again, pressurized hydraulic fluid from the first hydraulic pump 52 and the second hydraulic pump 54 is supplied to the front hydraulic motor 30 and the rear hydraulic motor 42 to propel the feller-buncher 10 in the desired direction. To steer the feller-buncher 10, pressurized hydraulic fluid is advanced to the right steering cylinder 86 and the left steering cylinder 88 to steer the feller-buncher 10 in the desired direction.

To unload the trees at a desired location, the trees must first be unsecured from the work tool 62. To unsecure the trees from the work tool 62, the arm cylinder 78 is retracted causing the work arms 76, 77 to move from the securing position to the receiving position thereby releasing the trees from the work tool 62. To move the trees from the work tool 62 to the site, the work tool 62 must be tilted forward in the general direction of arrow 26 so that the trees will fall to the ground in front of the feller-buncher 10. To tilt the work tool 62, the tilt cylinder 68 must be extended so as to cause the work tool 62 to rotate in the general direction of arrow 26.

It should be appreciated that as the work tool 62 rotates relative to the yoke 56, the leading edge LE of the cutting tool 70 does not move substantially closer to the ground, thus reducing the likelihood that the cutting tool 70 would come into contact with an object, such as a rock, as the feller-buncher 10 is unloaded.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the feller-buncher described herein. It will be noted that alternative embodiments of the feller-buncher of the present invention may not include all of the features described yet still benefit from at least some of the advantages of such features. Those of ordinary skill in the art may readily devise their own implementations of a feller-buncher that incorporate one or more of the features of the present invention and fall within the spirit and scope of the present invention as defined by the appended claims.

What is claimed is:

1. A method of operating a feller-buncher having (i) a first hydraulic motor operable to rotate a first axle having a number of first wheels attached thereto, (ii) a second hydraulic motor operable to rotate a second axle having a number of second wheels attached thereto, (iii) a first hydraulic pump operable to supply pressurized hydraulic fluid, and (iv) a first flow sharing valve operable to receive pressurized hydraulic fluid from said first hydraulic pump, comprising the steps of:

advancing said pressurized hydraulic fluid from said first hydraulic pump to said first flow sharing valve; and distributing said pressurized hydraulic fluid from said first hydraulic pump evenly between said first hydraulic motor and said second hydraulic motor with said first flow sharing valve such that said first axle and said second axle are driven at a substantially equal speed relative to one another.

2. The method of claim 1, wherein:

said first flow sharing valve has a forward drive position and a reverse drive position, and said distributing step includes the step of distributing said pressurized hydraulic fluid from said first hydraulic pump evenly between said first hydraulic motor and said second hydraulic motor with said flow sharing valve such that said first axle and said second axle are driven in a forward direction at said substantially equal speed relative to one another when said first flow sharing valve is positioned in said forward drive position.

3. The method of claim 2, wherein said distributing step includes the step of distributing said pressurized hydraulic fluid from said first hydraulic pump evenly between said first hydraulic motor and said second hydraulic motor with said flow sharing valve such that said first axle and said second axle are driven in a reverse direction at said substantially equal speed relative to one another when said first flow sharing valve is positioned in said reverse drive position.

4. The method of claim 1, wherein said feller-buncher further has (i) a second hydraulic pump, and (ii) a second flow sharing valve operable to receive pressurized hydraulic fluid from said second hydraulic pump, further comprising the steps of:

advancing said pressurized hydraulic fluid from said second hydraulic pump to said second flow sharing valve; and distributing said pressurized hydraulic fluid from said second hydraulic pump evenly between said first hydraulic motor and said second hydraulic motor with said second flow sharing valve.

5. The method of claim 4, wherein said feller-buncher further has a hydraulically powered work tool, further comprising the step of distributing said pressurized hydraulic fluid from said second hydraulic pump evenly between each of said first hydraulic motor, said second hydraulic motor, and said work tool with said second flow sharing valve.

6. The method of claim 5, wherein said work tool includes a hydraulically powered saw.

7. The method of claim 5, wherein said work tool includes a pair of hydraulically powered clamp arms.

8. A feller-buncher, comprising:

a first axle having a number of first wheels attached thereto;

a second axle having a number of second wheels attached thereto;

a first hydraulic motor operable to rotate said first axle;

a second hydraulic motor operable to rotate said second axle;

a first hydraulic pump operable to supply pressurized hydraulic fluid; and a first flow sharing valve fluidly coupled to each of said first hydraulic pump, said first hydraulic motor, and said second hydraulic motor, wherein said first flow sharing valve is configured to distribute said pressurized hydraulic fluid from said first hydraulic pump evenly between said first hydraulic motor and said second hydraulic motor, whereby said first axle and said second axle are driven at a substantially equal speed relative to one another.

9. The feller-buncher of claim 1, wherein:

said first flow sharing valve is positionable between a forward drive position and a reverse drive position, and said first flow sharing valve is further configured to distribute said pressurized hydraulic fluid from said first hydraulic pump evenly between said first hydraulic motor and said second hydraulic motor such that said first axle and said second axle are driven in a forward direction when said first flow sharing valve is positioned in said forward drive position.

10. The feller-buncher of claim 9, wherein said first flow sharing valve is further configured to distribute said pressurized hydraulic fluid from said first hydraulic pump evenly between said first hydraulic motor and said second hydraulic motor such that said first axle and said second axle are driven in a reverse direction when said first flow sharing valve is positioned in said reverse drive position.

11. The feller-buncher of claim 8, further comprising:

a second hydraulic pump operable to supply pressurized hydraulic fluid; and a second flow sharing valve fluidly coupled to each of said second hydraulic pump, said first hydraulic motor, and said second hydraulic motor, wherein said second flow sharing valve is configured to distribute said pressurized hydraulic fluid from said second hydraulic pump evenly between said first hydraulic motor and said second hydraulic motor.

12. The feller-buncher of claim 11, further comprising a hydraulically powered work tool which is fluidly coupled to said second flow sharing valve, wherein said second flow sharing valve is further configured to distribute said pressurized hydraulic fluid from said second hydraulic pump evenly between each of said first hydraulic motor, said second hydraulic motor, and said work tool.

13. The feller-buncher of claim 12, wherein said work tool includes a hydraulically powered saw.

14. The feller-buncher of claim 12, wherein said work tool includes a pair of hydraulically powered clamp arms.

15. A method of operating a feller-buncher having (i) a first hydraulic motor operable to rotate a first axle having a number of first wheels attached thereto, (ii) a hydraulically powered work tool, (iii) a first hydraulic pump operable to supply pressurized hydraulic fluid, and (iv) a first flow sharing valve operable to receive pressurized hydraulic fluid from said first hydraulic pump, comprising the steps of:

advancing said pressurized hydraulic fluid from said first hydraulic pump to said first flow sharing valve; and distributing said pressurized hydraulic fluid from said first hydraulic pump evenly between said first hydraulic motor and said work tool with said first flow sharing valve.

16. The method of claim 15, wherein said work tool includes a hydraulically powered saw.

17. The method of claim 15, wherein said work tool includes a pair of hydraulically powered clamp arms.

* * * * *